United States Patent [19]

Moriguchi et al.

[11] 4,388,628
[45] Jun. 14, 1983

[54] MULTI-COLOR THERMAL TRANSFER RECORDER

[75] Inventors: Haruhiko Moriguchi; Yoshiki Kikuchi; Takashi Ohmori, all of Ebina, Japan

[73] Assignee: Fuji Xerox Co., Ltd., Tokyo, Japan

[21] Appl. No.: 295,297

[22] Filed: Aug. 24, 1981

[30] Foreign Application Priority Data

Sep. 1, 1980 [JP] Japan .............................. 55-119719

[51] Int. Cl.³ .......................................... G01D 15/10
[52] U.S. Cl. .............................................. 346/76 PH
[58] Field of Search ................... 346/76 PH; 400/120

[56] References Cited

U.S. PATENT DOCUMENTS 3,792,481 2/1974 Nagashima et al. .......... 346/76 R X
4,250,511 2/1981 Stein et al. ..................... 346/76 PH Primary Examiner—Donald A. Griffin
Attorney, Agent, or Firm—Sughrue, Mion, Zinn, Macpeak & Seas

[57] ABSTRACT

A multi-color thermal transfer recorder has a thermal recording head, a roll disposed opposite to the thermal recording head, and an ink donor sheet having two or more layers of single-color ink different in color from each other, the length of each ink layer being equal to the length of the outer circumference of the opposing roll.

11 Claims, 5 Drawing Figures

1

MULTI-COLOR THERMAL TRANSFER RECORDER

BACKGROUND OF THE INVENTION

1. Field of the Invention

This invention relates to a thermal transfer recorder, and more particularly to a multi-color, thermal transfer, recorder so arranged that an image in multiple colors is recorded on a recording sheet.

2. Description of the Prior Art

In a conventional recorder for recording a multi-color image, thermal recording heads a, b, c and d must be provided in an opposing relation to thermal transfer recording media A, B, C and D of different color, as shown in FIG. 1. Shown at 11, 12, 13 and 14 are sensors for sensing the leading edge of a recording sheet, and at 15 a recording sheet passage.

When it is desired to record an image in multiple colors by using the thermal transfer recorder described above, it has been mandatory that accuracy in registration of respective thermal heads with a recording sheet be maintained below a density at which an image is scanned (a scanning density). To this end, a large number of elements must be provided, resulting in the complicated construction of the recorder, an increased manufacturing cost, and poor reliability in performance.

SUMMARY OF THE INVENTION

It is accordingly an object of the present invention to provide a multi-color, thermal transfer recorder, which is improved in construction, so as to eliminate the above described drawbacks, and is made simple in structure, so as to reduce the manfacturing cost.

To attain these and other objects, a multi-color ink donor sheet is used as the thermal transfer recording medium so that the multi-color recording may be achieved by a single thermal recording head.

DESCRIPTION OF THE PREFERRED EMBODIMENTS

FIGS. 2 through 5 show preferred embodiments of the invention.

Figure 3:
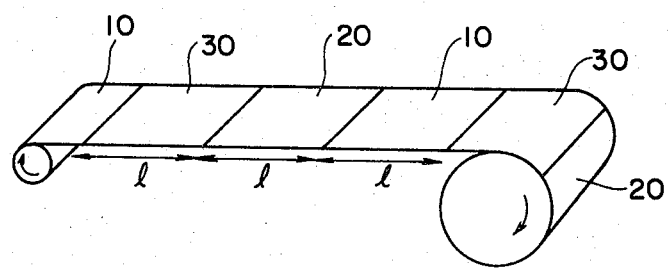
FIG. 3 is a perspective view of an ink donor sheet suited for use with the recorder of the invention.

Shown at 1 is a thermal recording head, at 3 a roll disposed in an opposing relation to the thermal recording head 1, and at 2 an ink donor sheet in the form of a belt. Layers of ink, such as yellow, cyan and magenta 10, 20 and 30 are formed on the surface of the ink donor sheet 2 in the order described in a side-by-side relation to each other in the direction of travel of the recording medium as shown in FIG. 3. Each ink layer has the same melting point and has a length equal to the length of the outer circumference of the opposing roll 3, as best seen in FIG. 3. The ink donor sheet is guided from a supply reel 18 to a take-up reel 7 by first and second sets of idlers 16 and 17.

A recording sheet 6 is wound about the opposing roll 3 and a clip 4 is provided for winding the recording sheet 6 to the opposing roll 3. A stripping finger 5 serves as a paper guide and a take-up reel 7 is used to take up the ink donor sheet 2.

In operation, the take-up reel 7 rotates causing the ink donor sheet 2 to travel between the contacting portion between the thermal recording head 1 and the opposing roll 3 at a speed equal to the peripheral speed of the roll 3.

Figure 1:
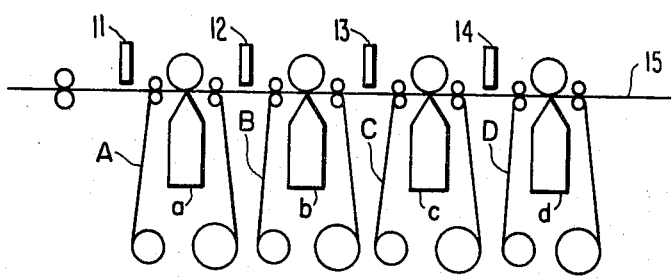
FIG. 1 is a schematic view of a conventional multi-color thermal transfer recorder.
Figure 2:
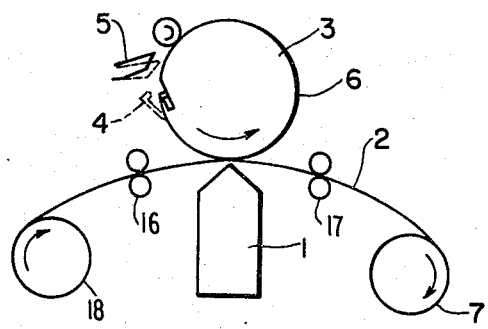
FIG. 2 is a schematic view of a recorder showing a first embodiment of the invention.

The procedure for producing an image in multiple colors on the recording sheet 6 by using the thermal transfer recorder shown in FIG. 2 is as follows.

During the first rotation cycle of the opposing roll 3, the yellow layer 10 on the ink donor sheet 2 comes into contact with the recording head 1. During the next rotation cycle of the opposing roll 3, the cyan portion 20 on the ink donor sheet 2 comes into contact with the recording sheet 6 thereby recording a cyan image on the recording sheet 6 by the thermal recording head 1. During the third rotation cycle, the maggenta portion 30 comes into contact with the recording sheet 6 recording a magenta image on the recording sheet 6 by the thermal recording head 1. Consequently, an image in three colors is thermally transferred by the three rotation cycles by the thermal recording head 1 responding to picture information during each rotation cycle of the opposing roll 3.

When the image in three colors has been recorded on the recording sheet 6, the clip 4 is released from the recording sheet 6, and the recording sheet 6 is separated and removed from the opposing roll 3 by the stripping finger 5 serving as the paper guide.

Since the size of the outer circumference of the opposing roll 3 is equal to the length of each of the color portions 10, 20 and 30 of the ink donor sheet 2, as described above, multiple colors are transferred in register with each other on the recording sheet 6 by the three rotation cycles of the opposing roll 3.

Figure 4:
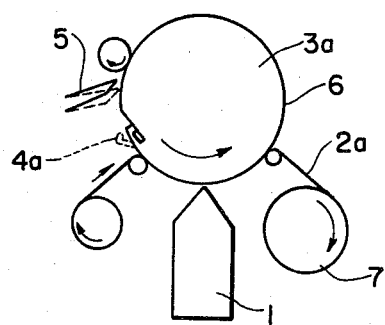
FIG. 4 is a schematic view of a recorder showing a second embodiment.

FIG. 4 is a schematic view of the recorder showing a second embodiment of the invention.

An ink donor sheet 2a has four layers of colored ink, yellow, cyan, magenta and black ink, each layer having the same melting point. The length of each color layer is again equal to the length of the outer circumference of the opposing roll. The ink donor sheet 2a is guided by idlers 16a and 17a to and from the opposing roll 3a so that the ink donor sheet 2a and the recording sheet 6 are in close contact as the ink donor sheet 2a passes between the idlers 16a and 17a. The roll 3a is disposed in an opposing relation to the thermal recording head 1 and is covered by a rubber sheet over the entire outer peripheral surface thereof, so that the recording sheet 6 closely contacts the opposing roll 3a through the medium of the ink donor sheet 2a. A clip 41 fastens the recording sheet to the opposing roll 3a, the clip 4a being covered with rubber and being attached to the outer peripheral surface thereof.

Similar steps are required to record an image in multiple colors by using the thermal transfer recorder shown in FIG. 4 as are required using the recorder shown in FIG. 2. Assuming the ink donor sheet 2a has four layers of colored ink, four cycles of picture information must be applied to the thermal recording head 1, and the opposing roll 3a must be rotated through four cycles. When four color images have been recorded on the recording sheet 6, the sheet 6 is removed from the opposing roll 3a by means of the stripping finger 5 serving as a paper guide.

Figure 5:
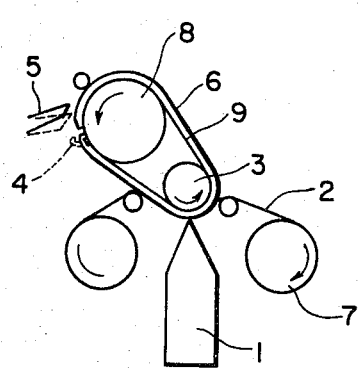
FIG. 5 is a schematic view of a recorder showing a third embodiment of the invention.

FIG. 5 shows a third embodiment. A roll 8 is connected to the opposing roll 3 by means of a belt 9, and the recording sheet 6 is placed on the outer surface of the belt 9. The length of the belt 9 in the travelling direction is equal to the length of each of the color layers on the ink donor sheet 2.

The steps for recording an image in colors on the recording sheet 6 in this embodiment are the same as those in the first and second embodiments.

In these embodiments, plural kinds of colored ink having the same melting points are used, and the recorded image has no gradation. The number of reproducible colors is thus limited.

In order to record an image with multiple gradations, an ink donor sheet 2 or 2a must be used that has multiple layers of ink formed thereon so that every color has a high melting point. This allows the amount of ink being transferred to increase as heat energy being applied to the thermal recording head is raised as described in A color image with multiple gradations having a desired contrast is obtained by using the ink donor sheet as described above and by adjusting the heat energy according to picture formation for each color. The number of reproducible colors is increased, thus permitting reproduction of a colorful image.

The present invention utilizes the ink donor sheet having thereon plural layers of multiple-color ink as a thermal transfer recording medium. By the use of the multicolor ink donor sheet, the structure of the recorder is simplified and the manufacturing costs of the recorder are reduced. Furthermore, a print having an image in multiple colors is produced at a low cost.

A further advantage is that, in recording multiple colors, and registering the respective colors, the position of an ink image recorded in subsequent cycles is automatically determined at every cycle of rotation of the opposing roll 3, and this facilitates the operation for recording respective colors.

In the foregoing, description has been made for the case where layers of multi-color ink different in color from each other are formed in succession on the ink donor sheet 2 over the entire length thereof, each of the layers of multi-color ink being equal in length to the length of the outer circumference of the roll 3 opposing the thermal head 1. In practice, allowances or margins are left in the leading and trailing end portions of the recording sheet 6 because the recording sheet must be wound to the opposing roll.

An ink donor sheet has no ink layer in the portions that correspond with the allowances or margins in the recording sheet 6. The use of such an ink donor sheet is included within the scope of the present invention.

We claim:

1. A multi-color, thermal transfer, recorder wherein a plurality of single-color images different in color from each other are recorded in superimposed fashion on a recording sheet producing an image in multiple colors, comprising:
   a thermal recording head;
   a roll disposed in an opposing relation to said thermal recording head;
   an ink donor sheet adapted to travel through a contacting portion between said thermal recording head and said roll opposing said recording head; and
   said ink donor sheet having two or more layers of single-color ink different in color from each other, each of said two or more ink layers having a length equal to a length of an outer circumference of said opposing roll.

2. The recorder claimed in claim 1 further comprising a clip attached to said opposing roll for winding said recording sheet onto said opposing roll.

3. The recorder claimed in claim 2 further comprising a stripping finger for separating and removing said recording sheet from said opposing roll after said plurality of single-color images different in color have been recorded on said recording sheet.

4. The recorder claimed in claim 3 further comprising a supply reel and a take-up reel, said ink donor sheet being transported from said supply reel, through said contacting portion between said thermal recording head and said opposing roll to said take-up reel, and first and second idler means for guiding said ink donor sheet to and from said opposing roll.

5. The recorder claimed in claim 4 wherein said first and second sets of idler means are adjacent to said opposing roll so that said ink donor sheet passing between said first and second sets of idler means is adjacent to a bottom circumference section of said opposing roll.

6. The recorder claimed in claim 1 or 5 wherein said opposing roll is covered by a rubber sheet over an entire peripheral surface thereof.

7. The recorder claimed in claim 1 further comprising a second roll and a belt, said second roll being connected to said opposing roll by said belt, each of said two or more ink layers having a length equal to a length of an outer circumference of said belt.

8. The recorder claimed in claim 7 further comprising a clip attached to said belt for winding said recording sheet onto said belt.

9. The recorder claimed in claim 8 further comprising a stripping finger for separating and removing said recording sheet from said belt after said plurality of single-color images different in color have been recorded on said recording sheet.

10. The recorder claimed in claim 1, 2, 3, 4, 5 or 9 wherein said ink donor sheet has multiple layers of ink formed thereon so that every color has a high melting point allowing the amount of ink being transferred to said recording sheet to vary depending upon the amount of heat energy being applied to said thermal recording head.

11. A multi-color, thermal transfer, recorder wherein a plurality of single-color images different in color from each other are recorded in a superimposed fashion on a recording sheet producing an image in multiple colors, comprising:
   a thermal recording head;
   a roll disposed in an opposing relation to said thermal recording head;
   an ink donor sheet adapted to travel through a contacting portion between said thermal recording head and said roll opposing said recording head; and
   said ink donor sheet having two or more layers of single-color ink different in color from each other, said two or more layers of single-color ink being disposed adjacent to one another and each of said layers extending across an entire width portion of said ink donor sheet.

* * * * *